(12) United States Patent
Alsman et al.

(10) Patent No.: US 11,557,934 B2
(45) Date of Patent: Jan. 17, 2023

(54) INTERIOR BUS BAR FOR ELECTRIC MACHINE WINDING

(71) Applicant: BorgWarner Inc., Auburn Hills, MI (US)

(72) Inventors: Ian N. Alsman, Indianapolis, IN (US); Christopher Bledsoe, Anderson, IN (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/514,300

(22) Filed: Oct. 29, 2021

(65) Prior Publication Data
US 2022/0052573 A1 Feb. 17, 2022

Related U.S. Application Data

(63) Continuation of application No. 16/681,545, filed on Nov. 12, 2019, now Pat. No. 11,165,301.

(51) Int. Cl.
*H02K 3/28* (2006.01)
*H02K 3/50* (2006.01)
*H02K 3/12* (2006.01)

(52) U.S. Cl.
CPC ............. *H02K 3/28* (2013.01); *H02K 3/12* (2013.01); *H02K 3/50* (2013.01); *H02K 2203/09* (2013.01)

(58) Field of Classification Search
CPC .. H02K 3/28; H02K 3/12; H02K 3/50; H02K 2203/09
See application file for complete search history.

(56) References Cited

U.S. PATENT DOCUMENTS

| | | |
|---|---|---|
| 7,135,793 B2 | 11/2006 | Seguchi |
| 8,716,910 B2 | 5/2014 | Edrington |
| 9,768,655 B2 | 9/2017 | Neet |
| 9,941,762 B2 | 4/2018 | Tamura |
| 9,954,408 B2 | 4/2018 | Nakamura et al. |
| 10,069,364 B2 | 9/2018 | Magri |
| 10,239,154 B2 | 3/2019 | Ciampolini |
| 10,250,096 B2 | 4/2019 | Nishikawa |
| 10,256,693 B2 | 4/2019 | Jang |
| 10,277,088 B2 | 4/2019 | Ciampolini |
| 10,298,083 B2 | 5/2019 | Okamoto et al. |
| 10,424,983 B2 | 9/2019 | Takasaki |
| 10,505,423 B2 | 12/2019 | Dang |
| 10,998,789 B2 | 5/2021 | Tategata |
| 11,146,136 B2 * | 10/2021 | Alsman .................. H02K 5/225 |

(Continued)

*Primary Examiner* — Robert W Horn
(74) *Attorney, Agent, or Firm* — Maginot, Moore & Beck, LLP (57) ABSTRACT

An electric machine includes a core with windings positioned on the core. The windings include in-slot portions, end turns, and leads. The in-slot portions are positioned in slots of the core. The end turns extend from the in-slot portions at ends of the core. The leads extend from the in-slot portions and axially past the end turns. A bus bar assembly is positioned radially inward from the end turns. The bus bar assembly includes an arc portion, a plurality of axial lead connectors, and a plurality of axial phase terminals. The arc portion is positioned axially within the end turns. The axial lead connectors extend axially past the end turns and are connected to the leads. The axial phase terminals also extend axially past the end turns.

20 Claims, 6 Drawing Sheets

(56) References Cited

U.S. PATENT DOCUMENTS

| | | |
|---|---|---|
| 11,165,301 B2 * | 11/2021 | Alsman .................... H02K 3/28 |
| 2003/0214190 A1 | 11/2003 | Congdon et al. |
| 2009/0127948 A1 | 5/2009 | Shimizu et al. |
| 2017/0310183 A1 | 10/2017 | Jang et al. |
| 2020/0412195 A1 | 12/2020 | Mayer et al. |
| 2021/0143698 A1 | 5/2021 | Alsman et al. |
| 2021/0143699 A1 | 5/2021 | Alsman et al. |

\* cited by examiner

INTERIOR BUS BAR FOR ELECTRIC MACHINE WINDING

CROSS-REFERENCE TO RELATED APPLICATIONS

This application is a continuation of U.S. patent application Ser. No. 16/681,545, filed Nov. 12, 2019, now U.S. Pat. No. 11,165,301, the entire contents of which are incorporated herein by reference.

FIELD

This application relates to the field of electric machines, and more particularly, winding arrangements and terminal connections for electric machines.

BACKGROUND

Electric machines are typically designed to meet specific operating requirements and space constraints. Examples of design features that contribute to operating performance include stator size, rotor size, type and arrangement of the windings, and any of various other design parameters as will be recognized by those of ordinary skill in the art. All operating requirements for the electric machine must be met while also meeting certain space constraints that are dependent upon the application for the electric machine. For automotive applications, space within the engine compartment is limited, and designers must be concerned with the overall diameter and length of the electric machine. Accordingly, limiting the size of an electric machine without sacrificing performance features is important.

Stators of electric machines include windings that include a plurality of phase leads. These leads must be connected to electronics equipment associated with the electric machine, such as an inverter or rectifier. A typical arrangement for the phase leads is to route them in the space directly over the end turns (i.e., "over" meaning the space axially outward from the end turns but at a similar radial position). This routing of the leads over the end turns contributes to additional length of the electric machine.

It would be desirable to provide an electric machine with an alternative lead configuration that results in a reduced length of the electric machine. It would also be advantageous if such an electric machine could be utilized in various power applications, such as various electric and/or hybrid-electric vehicle applications. It would be of further advantage if such an electric machine could be easily manufactured, thus reducing manufacturing time and costs. While it would be desirable to provide an electric machine that provides one or more of these or other advantageous features as may be apparent to those reviewing this disclosure, the teachings disclosed herein extend to those embodiments which fall within the scope of the appended claims, regardless of whether they accomplish one or more of the above-mentioned advantages.

SUMMARY

In accordance with at least one embodiment of the disclosure, an electric machine comprises a stator assembly including a core with windings positioned on the core. The windings including in-slot portions, end turns, and leads. The in-slot portions are positioned in slots of the core, and the end turns extend from the in-slot portions at ends of the core. The leads extend from the in-slot portions at one of the ends of the core with the leads extending outward from the end turns. The leads include a first plurality of leads associated with conductors in an inner layer of the slots and a second plurality of leads associated with conductors in an outer layer of the slots. A bus bar assembly is positioned radially inward from the end turns. The bus bar assembly includes a bus encasement and a plurality of lead connectors extending from the bus encasement. Each of the plurality of lead connectors is connected to one of the first plurality of leads or one of the second plurality of leads.

In accordance with another embodiment of the disclosure, a bus bar assembly for an electric machine comprises an encasement, a plurality of electrically conductive phase terminals, and a plurality of electrically conductive lead connectors. The encasement is comprised of an electrically insulating material and includes an arc portion defining an axially directed face and an outer circumferential sidewall. The plurality of phase terminals extend axially from the face. The plurality of lead connectors also extend axially from the face along the outer circumferential sidewall. Each of the plurality of lead connectors is electrically connected to one of the plurality of phase terminals within the encasement.

In accordance with yet another embodiment of the disclosure an electric machine comprises a core with windings positioned on the core. The windings include in-slot portions, end turns, and leads. The in-slot portions are positioned in slots of the core. The end turns extend from the in-slot portions at ends of the core. The leads extend from the in-slot portions and past the end turns in an axial direction. A bus bar assembly is positioned radially inward from the end turns. The bus bar assembly includes an arc portion, a plurality of axial lead connectors, and a plurality of axial phase terminals. The arc portion is positioned within the end turns in the axial direction. The axial lead connectors extend past the end turns in the axial direction and are connected to the leads. The axial phase terminals also extend past the end turns in the axial direction.

The above described features and advantages, as well as others, will become more readily apparent to those of ordinary skill in the art by reference to the following detailed description and accompanying drawings. While it would be desirable to provide an electric machine with a bus bar arrangement that provides one or more of these or other advantageous features, the teachings disclosed herein extend to those embodiments which fall within the scope of the appended claims, regardless of whether they accomplish one or more of the above-mentioned advantages.

DESCRIPTION

Figure 1:
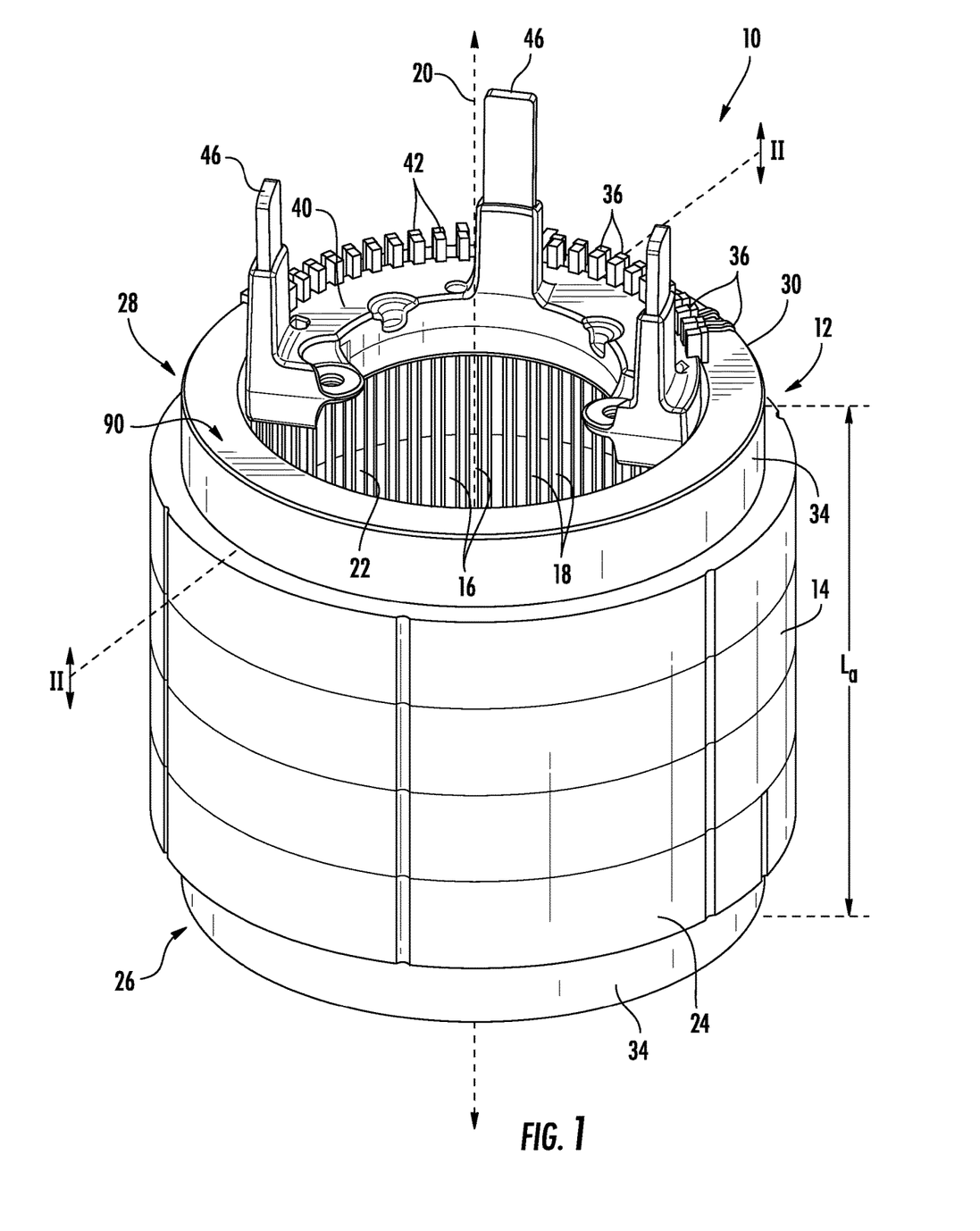
FIG. 1 shows a perspective view of an electric machine including a stator assembly and a bus bar assembly.

With reference to FIG. 1, an electric machine 10 includes a stator assembly 12 with a bus bar assembly 40 positioned thereon. The stator assembly 12 includes a stator core 14 with a winding arrangement 30 positioned on the stator core 14. A rotor of the electric machine (not shown) is configured to be rotatably mounted within the stator core 14. The winding arrangement 30 includes a plurality of phase windings, each of the phase windings terminating in one of a plurality of leads 36. The bus bar assembly 40 is provided at one end of the stator assembly 12 and is electrically connected to the winding leads 36. As described herein, the bus bar assembly 40 is positioned radially within the end turns 34 of the windings 30.

Figure 2:
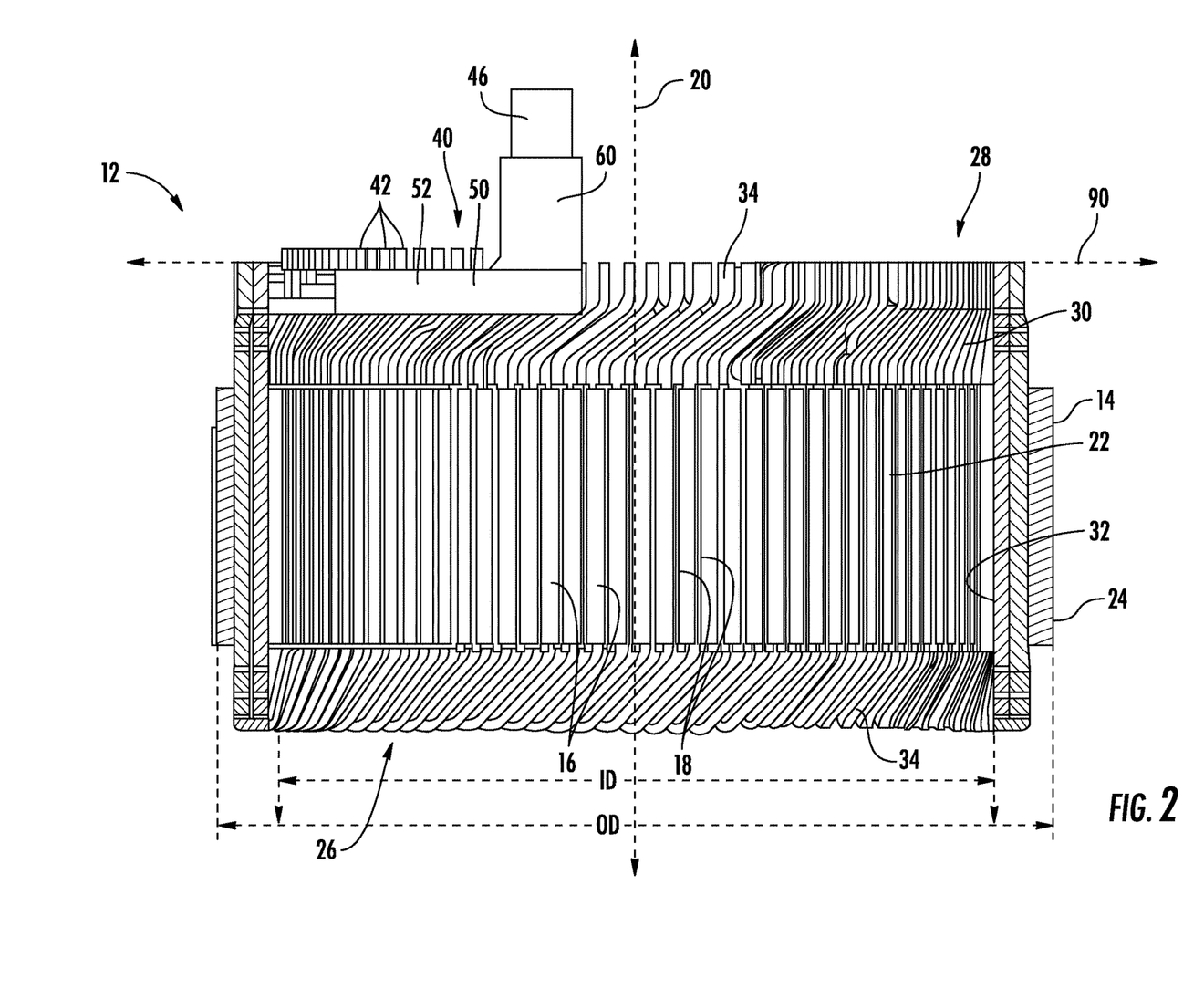
FIG. 2 shows a cutaway view of the stator assembly along plane II-II of FIG. 1.
Figure 3:
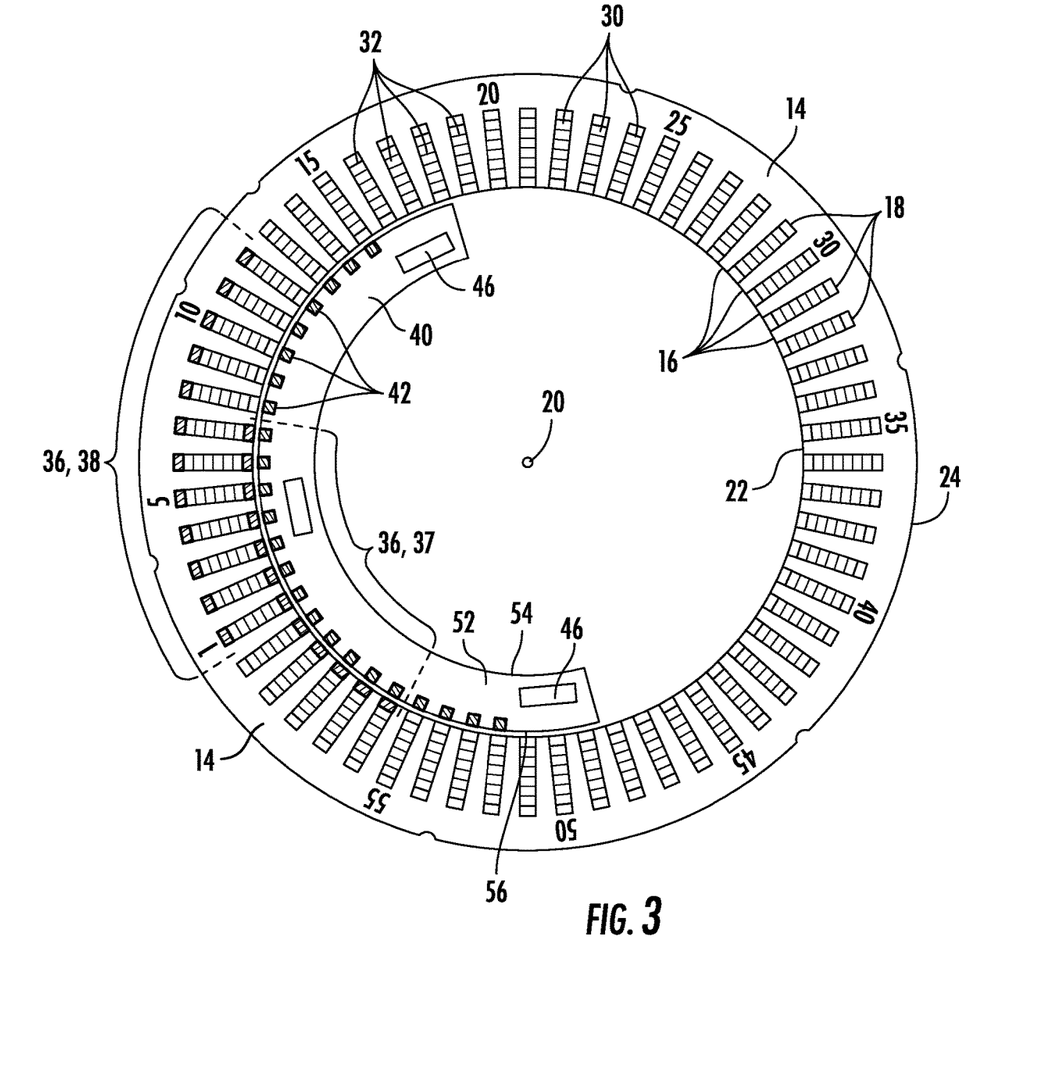
FIG. 3 is a plan view of the end of the stator assembly of FIG. 1 in isolation from the end turns of the windings in order to show the position of the winding leads relative to the bus bar connectors of the bus bar assembly.

With reference now to FIGS. 1-3, the stator assembly 12 includes both the stator core 14 and the winding arrangement 30. The stator core 14 is comprised of a ferromagnetic material and is typically formed from a plurality of steel sheets that are stamped and stacked upon one another to form a lamination stack. The stator core 14 is generally cylindrical in shape as defined by a center axis 20, and includes an inner perimeter surface 22 defining an inner diameter of the core, and an outer perimeter surface 24 defining an outer perimeter of the core. The inner perimeter surface 22 defines an inner diameter (ID) for the stator assembly 12. The outer perimeter surface 24 defines an outer diameter (OD) for the stator assembly 12. A plurality of teeth 16 are formed on the interior of the stator core 14 and directed inwardly toward the center axis 20. Each tooth 16 extends radially inward and terminates at the inner perimeter surface 22. Axial slots 18 are formed in the stator core 14 between the teeth 16.

The slots 18 may be open along the inner perimeter surface 22 of the stator core 14, or may be semi-closed slots with each slot 18 having a smaller width near the inner perimeter surface 22 than the width closer to the outer perimeter surface 24. Openings to the slots 18 are provided through the inner perimeter surface as well as through both ends of the stator core 14. Each slot 18 is defined between adjacent teeth 16, with two adjacent teeth forming two opposing radial walls for one slot.

The stator core 14 is configured to retain the winding arrangement 30 within the slots 18 of the stator core 14. In at least one embodiment, the winding arrangement 30 is formed from a plurality of elongated wires (e.g., copper wires) that are continuously wound within the slots 18 on the stator core 14 in order to form the windings. In at least one alternative embodiment, the winding arrangement 30 is formed from a plurality of segmented conductors (e.g., copper conductor segments), as is known to those of skill in the art. The segmented conductors are inserted into the slots 18 from a first end 26 (e.g., an "insertion end") of the stator core 14. The segmented conductors are connected together at an opposite end 28 (e.g., a "weld end") of the stator core 14.

The conductors of the completed winding arrangement 30 form a plurality of phase windings. In at least one embodiment, the winding arrangement includes three phase windings (e.g., phase U windings, phase V windings, and phase W windings) with multiple paths for each phase. The three phase windings may be star ("Y") or delta ("Δ") connected, depending on the desired winding configuration.

The conductors that form the completed windings on the stator core include in-slot portions 32, end turns 34, and winding leads 36. The in-slot portions 32 are straight portions of the conductors located within the slots 18 of the stator core 14. Each in-slot portion 32 carries current from one end 26/28 of the stator core 14 to the opposite end 28/26 of the stator core. As will be recognized by those of skill in the art, the in-slot portions 32 may be aligned in a single file line in each slot from, and each position in the line may be referred to a conductor "layer". As best shown in FIG. 3, in the exemplary winding disclosed herein, each slot 18 includes eight layers of conductors arranged in a single file line from an innermost layer to an outermost layer.

With continued reference to FIGS. 1-3, the end turns 34 are the conductor portions where a change of direction occurs outside of the slots 18 at an end of the stator core 14. The end turns 34 may include bent portions and/or welded portions of the conductors. Each end turn 34 includes a conductor that exits one slot at an end of the stator core 14, forms an end loop (e.g., a "U-turn" or other 180° change of direction), and enters a different slot on the same end of the stator core. As such, each end loop 34 extends between two in-slot portions 32 and across a number of slots at an end of the stator core 14. The end turns 34 are collectively represented in FIG. 1 by a disc-like shape at each end of the 26/28 of the stator core, but it will be recognized that the end turns are actually individual conductors having a similar shape at an end of the stator core 14, such as the conductors shown as the end turns 34 in FIG. 2. A winding length in the axial direction, $L_a$, may be defined between the tips of the end turns 34 at opposite ends 26, 28 of the stator core 14. The "tip" of an end turn may be considered to be the outermost point/region on the end loop in the axial direction from the stator core. If the tips of the end turns on each side of the stator include at least one point that lies in a single plane (e.g., the plane 90 containing the flat disk-like shape in FIG. 1), $L_a$ may be defined as the distance between these two planes.

The winding leads 36 are conductor portions that provide a node (entry/exit) to one of the phase windings (or a branch of the phase winding). Each conductor forming a winding lead 36 is connected to an in-slot portion of the windings, and extends outward from the end turns 34. For example, as best shown in FIG. 1, each of the winding leads 36 extends in an axial direction slightly past the end turns 34. In at least some embodiments, the winding leads 36 may also have a radial or circumferential component. In any event, each winding lead 36 extends away from a slot and terminates at an end. As explained in further detail below, the end of each lead 36 is joined to one of the lead connectors 42 of the bus bar assembly 40. It will be recognized that the connection between the leads 36 and the lead connectors 42 may take any of various forms, such as soldering or welding (e.g., a tungsten inert gas (TIG) weld).

FIG. 3 is a plan view of the end 28 of the stator assembly 12 with the end turns 34 of the windings removed shows the position of conductors in the slots of the stator core. In the exemplary winding of FIG. 3, the winding is a three-phase winding (e.g., phases U, W and V) with each phase including four branches, and each branch including two leads. As a result, twenty-four total leads 36 are shown in FIG. 3. The leads 36 are illustrated in FIG. 3 as darkened rectangles within the slots 18 of the core 14. The leads include a set of inner leads 37 extending from an inner layer of the windings (and particularly, the innermost layer), and a sets of outer leads 38 extending from an outer layer of the windings (and particularly, the outermost layer). The inner leads 37 are identified in FIG. 3 as the darkened in-slot rectangles positioned between the arms of the inner bracket (i.e., the bracket associated with reference numerals 37, 36). Similarly, the outer leads 38 are identified in FIG. 3 as darkened in-slot rectangles positioned between the arms of the outer bracket (i.e., the bracket associated with reference numerals 36, 38). The inner leads 37 and the outer leads 38 are both located on the same end of the stator core as the bus bar assembly (i.e., the weld end 28).

Figure 7:
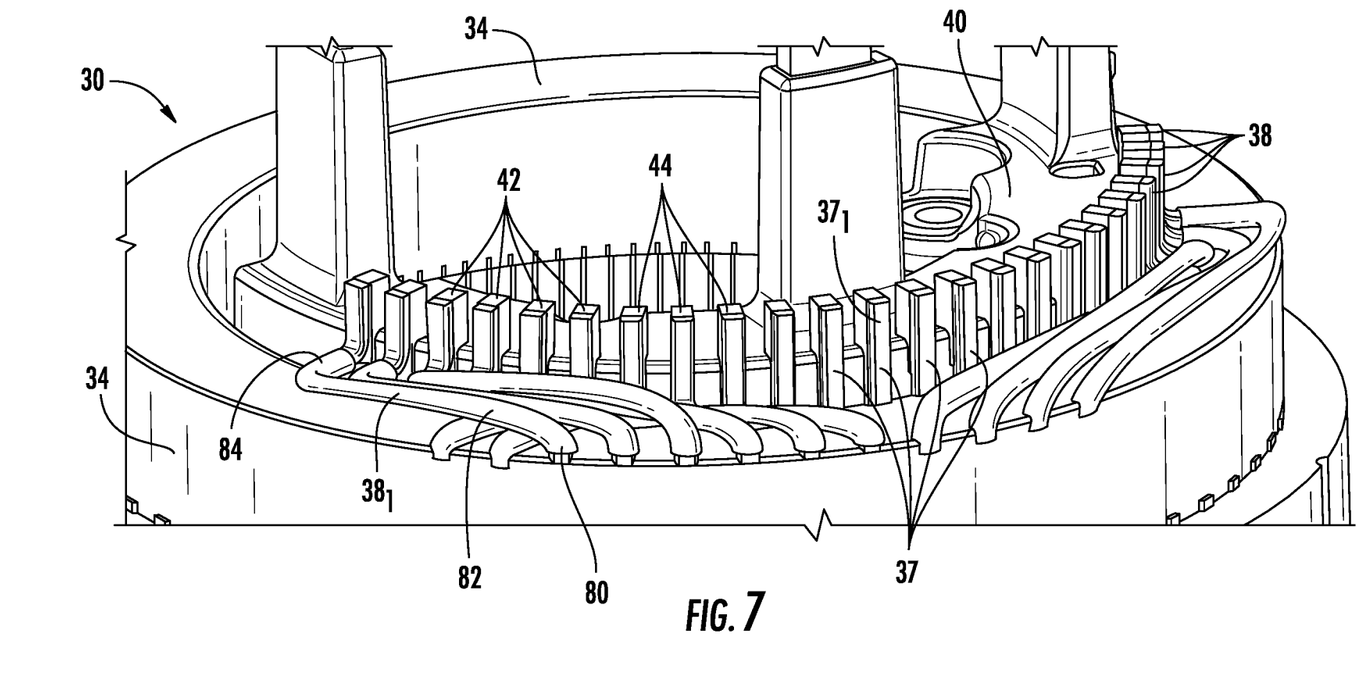
FIG. 7 shows an enlarged perspective view of the bus bar assembly of FIG. 1 positioned on the stator assembly with lead connectors of the bus bar assembly coupled to the leads of the phase winding.

As best shown by the exemplary lead $37_1$ of FIG. 7, the conductors that provide the inner leads 37 extend in an axial direction directly out of an inner layer of the stator slots and terminate without extending over any of the end turns 34 on the same end 28 of the winding. In other words, if the stator assembly is considered to define axial, radial, and circumferential coordinates, the ends/tips of the inner leads 37 do not share any identical radial and circumferential coordinate combinations with any of the end turns on the same end of the of the stator assembly.

Figure 5:
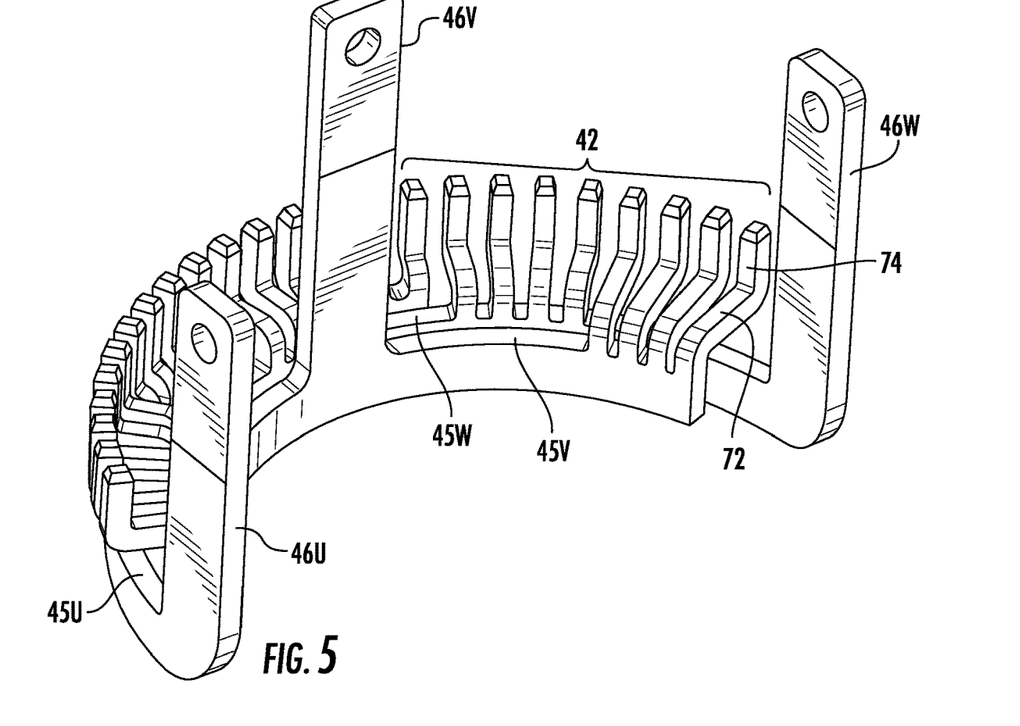
FIG. 5 shows a perspective view of the bus bars of the bus bar assembly of FIG. 4 in isolation from the encasement.

In contrast to the inner leads 37, the conductors that provide the outer leads 38 do extend over the end turns 34 on the same end of the stator assembly. As best shown in FIG. 5 by exemplary outer lead $38_1$, each outer lead includes a first axial portion 80 that extends out of an associated slot of the stator core 14, an elongated circumferential/radial portion 82 that extends over the end turns 34, and a second axial portion 84 that is connected to the bus bar assembly 40. Accordingly, it will be recognized that the winding arrangement 30 in the exemplary embodiment disclosed herein includes outer leads 38 that extend over the end turns 34 as well as inner leads 37 that do not extend over the end turns 34.

Figure 4:
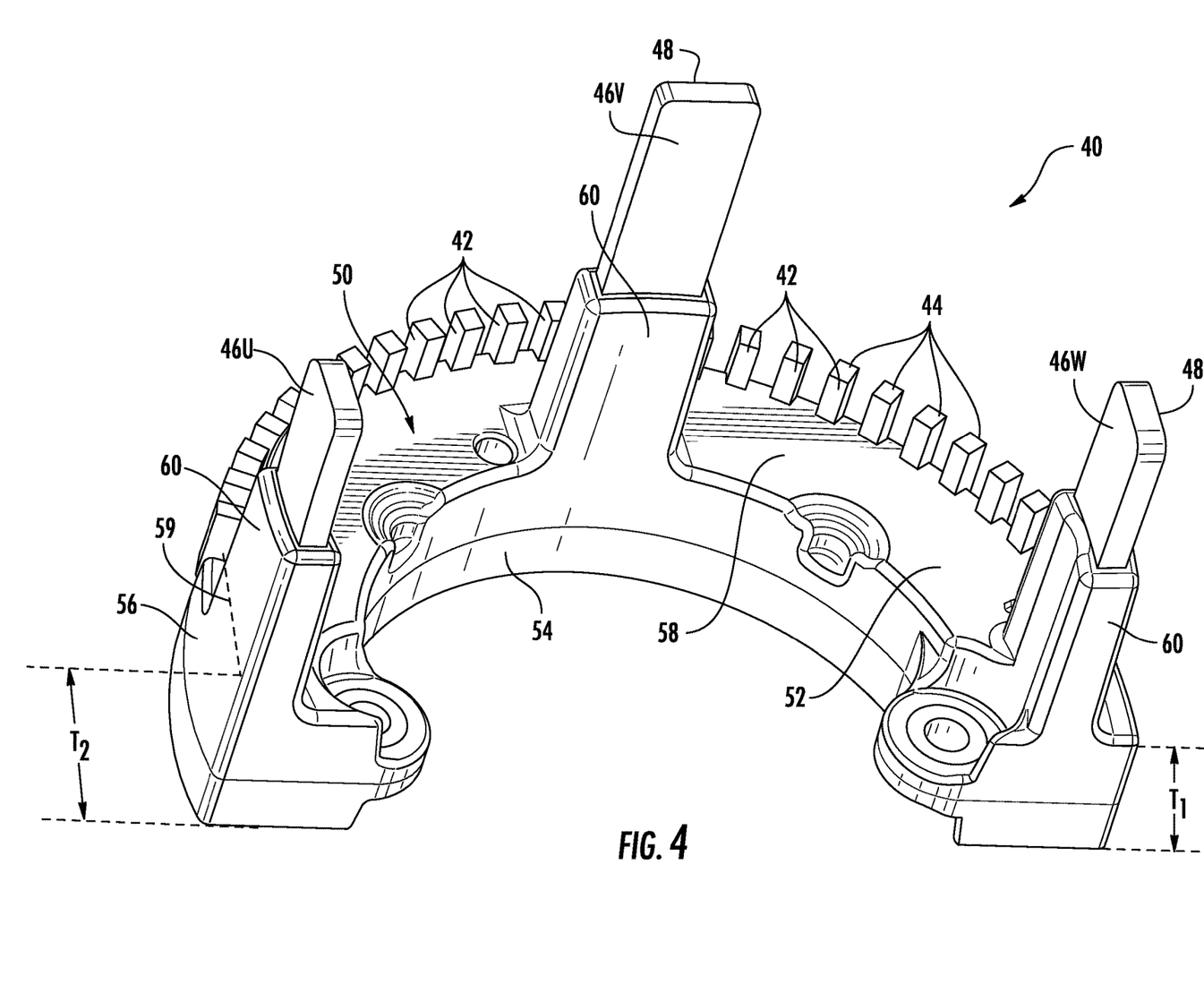
FIG. 4 shows a perspective view of the bus bar assembly of FIG. 1 in isolation, including a plurality of bus bars retained within and an encasement.
Figure 6:
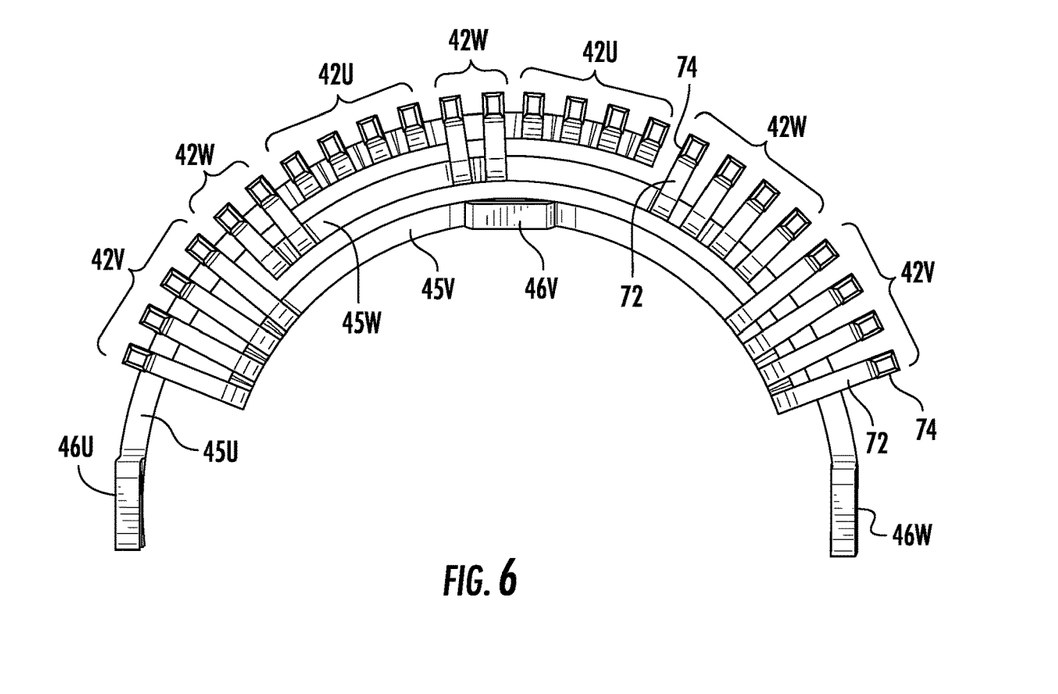
FIG. 6 shows a top plan view of the bus bars of FIG. 5.

With particular reference now to FIGS. 4-6, the bus bar assembly 40 is shown in isolation from the stator assembly 12. As shown in FIG. 4, the bus bar assembly 40 includes a plurality of lead connectors 42, three bus bars 45 (not shown in FIG. 4; see FIGS. 5 and 6; the three bus bars 45 individually 45U, 45V, 45W), and three phase terminals 46 (individually, 46U, 46V, 46W), all contained within an encasement 50 (which may also be referred to herein as a "bus encasement" or "bus bar encasement"). The lead connectors 42 and the phase terminals 46 all extend in an axial direction outwardly from the encasement 50.

The encasement 50 is generally semi-circular in shape includes an arc portion 52 as well as a plurality of terminal supports 60. The arc portion 52 is defined by a circular shape that is concentric with the circular cross-sectional shape of the stator core 14. The arc portion 52 may also be referred to as a partial disc or partial ring portion. The arc portion 52 includes an inner circumferential sidewall 54, outer circumferential sidewall 56, a first face/surface 58 that is relatively flat and faces axially outward, and an opposing second face/surface (not shown) that is also relatively flat and faces axially inward. The terminal supports extend axially outward from the first face 58. The distance between the first face 58 and the second face in the axial direction is shown in FIG. 4 as $T_1$, and may be considered to be a first axial thickness of the arc portion 52 of the bus bar assembly 40 (i.e., the thickness of the primary portion of the encasement 50 without regard to the terminal supports 60 that extend well past the first face 58 in the axial direction).

The encasement 50 is comprised of an electrically insulating material (e.g., a polymer or other material) that is molded or otherwise formed around portions of the lead connectors 42, the three bus bars, and portions of the phase terminals 46. As a result, the encasement 50 not only holds the bus bars in place but also serves as an electrical insulator to prevent current from flowing between the bus bars. The encasement 50 renders the bus bar assembly 40 a unitary component wherein the individual bus bars may not be removed from the assembly 40 without destruction of the encasement 50.

The lead connectors 42 are all provided by conductors that are exposed along the outer circumferential sidewall 56 of the encasement 50 and extend axially outward from the encasement 50. Each of the lead connectors 42 terminates at a distal end 44 that is removed from the first surface 58 of the encasement 50. Each of the lead connectors 42 also includes a proximal end (not shown) that is embedded in the encasement and coupled to one of the bus bars. In the embodiment disclosed herein, each of the lead connectors 42 is comprised of a conductor segment (e.g., a copper conductor) having a substantially rectangular cross-section. These conductor segments provide a row of axial pin members provided along the outer circumferential sidewall of the bus bar. While the lead connectors 42 have been described herein as being pin members arranged in a row with each pin member having a substantially rectangular cross-sectional shape, it will be recognized that the lead connectors 42 may be provided in other forms, shapes, and arrangements.

As shown in FIG. 4, a second axial thickness, $T_2$, of the bus bar assembly 40 direction may be defined in the axial direction between the distal ends 44 of the lead connectors 42 and the second face of the encasement (wherein the distal ends 44 of the lead connectors 42 lie in a common plane that is generally parallel to the planes containing the first and second faces of the encasement; dotted line 59 is provided for the sake of illustration in FIG. 4, and represents said common plane that includes the distal ends 44 of the lead connectors 42; $T_2$ is shown between as the distance between said common plane 59 and the second face of the encasement 50). Accordingly, it will be recognized that the second axial thickness, $T_2$, of the bus bar assembly 40 may be defined by the distal ends 42 of the lead connectors 44 and the second face of the encasement, without regard to the total length of the phase terminals 46, which may extend axially well past the first face.

The phase terminals 46U, 46V and 46W are provided by conductors that extend axially outward from the encasement 50. A distal end 48 of each phase terminal 46U, 46V and 46W is exposed axially outward from the associated terminal support 60. This distal end 48 of the phase terminal allows for easy connection of the electric machine to other electronic components, such as an inverter, rectifier, etc. Each of the phase terminals 46U, 46V and 46W also includes a proximal end that is embedded in the encasement and coupled to one of the bus bars. Each of the phase terminals 46U, 46V and 46W is comprised of a conductor segment (e.g., a copper conductor) that is relatively thick compared to that of the lead connectors 42. Also, in the embodiment disclosed herein, each of the phase terminals 46U, 46V and 46W is shown as having a substantially rectangular cross-section. However, it will be recognized that the phase terminals 46U, 46V and 46W may be provided in other forms and shapes.

Each of the three bus bars 45U, 45V, 45W is shown in FIGS. 5 and 6 in isolation from the encasement 50 in order to expose the bus bars 45. As shown in FIGS. 5 and 6, each of the three bus bars provides a connection between one of the phase terminals 46 and a plurality of the associated lead connectors 42. Accordingly, the proximal end of each lead connector 42 is connected to one of the three bus bars 45, and the proximal end of each phase terminal 46 is connected to one of the three bus bars within the encasement 50. Particularly, bus bar 45U extends between one set of lead connectors 42U and the phase terminal 46U; bus bar 45V extends between another set of lead connectors 42V and the phase terminal 46V; and bus bar 45W extends between yet another set of lead connectors 42W and the phase terminal 46W. Each of the three bus bars generally extends along the circular shape of the arc portion 52 of the encasement 50. In at least one embodiment, the bus bars may be arranged in different radial layers of the bus bar assembly 40. For example, as best shown in the exemplary embodiment of FIG. 6, the first bus bar 45U, the second bus bar 45V, and the third bus bar 45W are provided in a radially nested arrangement. In particular, the first bus bar 45U is formed as an arc in a outermost radial layer closest to the outer circumferential sidewall 56 of the encasement 50 (see FIG. 4); the second bus bar 45V is formed as an arc in an innermost radial layer closest to the inner circumferential sidewall 54 of the encasement 50; and the third bus bar 45W is formed as an arc in a middle radial layer. Each of the bus bars 45U, 45V, 45W is circumferentially offset from the other bus bars (i.e., none of the bus cars spas along the same circumferential path). At the same time, each of the bus bars 45U, 45V, 45W overlaps with the other bus bars in at least some circumferential positions (i.e., depending on the selected circumferential position, a radial line will extend through, one, two or three of the bus bars).

With continued reference to FIGS. 5 and 6, each lead connector 42 includes a radial portion 72 and an axial portion 74. The radial portion 72 of each lead connector 42 extends radially outward from the associated bus bar 45, and the axial portion 74 extends axially outward from the radial portion 72. In the exemplary embodiment of FIGS. 5 and 6, the radial portions 72 each have a different length in a radial direction as a result of the radially nested arrangement of the bus bars 45. For example, because the second bus bar 45V is radially inward from the third bus bar 45W, the radial portions 72 of the lead connectors 42V connected to the second bus bar 45V are longer than the radial portions 72 of the lead connectors 42W connected to the third bus bar 45W. Similarly, because the first bus bar is radially outward from the third bus bar, the radial portions 72 of the lead connectors 42W are longer than the radial portions 72 of the lead connectors 42U connected to the first bus bar 45U. Advantageously, the axial portions 74 of each lead are substantially the same in length and terminate in tips at the distal ends 48 that are generally co-planar and equally spaced apart in the circumferential direction. As a result, the lead connectors 42 may be easily aligned with and connected to the leads extending from an electric machine winding.

While the bus bars 42 are shown in FIGS. 5 and 6 as being arranged in radial layers, it will be appreciated that other arrangements are also possible. For example, in another exemplary embodiment, the three bus pars may be arranged in different axial layers. In such an arrangement, a first bus bar may provided in a first axial layer closest to the first face 58, a third bus bar may be provided in a third axial layer most remote from the first face 58, and a second bus bar may be provided in a second axial layer between the first and third axial layers. In any event, the electrically insulating material of the encasement 50 separates each of the bus bars in different layers, thus insulating the various electrical phases (e.g., U, V, W) from one another within the bus bar assembly.

With reference again to FIG. 7, the complete bus bar assembly 40 is shown positioned on the stator assembly 12. As shown in FIG. 7, the entire bus bar assembly 40 (including the outer circumferential sidewall 56, the lead connectors 42 and phase terminals 46) is positioned radially within the inner boundaries of the winding end turns 34 (i.e., within the ID boundary defined by the stator core 14 as shown in FIG. 2). Accordingly, all of the lead connectors 42, bus bars, and phase terminals 46 of the bus bar assembly 40 are located radially inside of the end turns 34. At the same time, some or most of the bus bar assembly (and specifically the arc portion 52 and related components) also remain axially within the axial boundaries of the end turns 34 (e.g., in the embodiment of FIG. 2, below the plane 90 that sits on the top of the end turns 34, and thus within the distance La as shown in FIG. 1). In at least some embodiments, 40% or more of the axial thickness $T_1$ of the arc portion 52 is disposed axially within the axial boundaries of the end turns 34 (i.e., within La). In other embodiments, at least 80% of the axial thickness $T_1$ of the arc portion 52 is disposed axially within the axial boundaries of the end turns 34.

In view of the foregoing, while the arc portion 52 of the bus bar assembly 40 and related components remain within the inner and axial boundaries of the end turns 34, it will be recognized that other portions of the bus bar assembly 40 extend outside of these boundaries. For example, in at least one embodiment, all of the lead connectors 42 and phase terminals 46 extend to axial positons that are beyond the end turns 34 (e.g., above the plane 90 in FIG. 2).

Each of the lead connectors 42 is connected to one of the winding leads 36. Connection between the winding leads 36 and the lead connectors 42 of the bus bar 40 is facilitated by the conductor segments that form the ends of the winding leads 36 (including the ends of both the inner leads 37 and the outer leads 38) being oriented axially and parallel to the conductor segments that provide the axial lead connectors 42 of the bus bar 40. As noted previously, because the entire bus bar assembly 40 is located radially within the inner boundaries of the end turns 34, none of the lead connectors 42 of the bus bar assembly 40 include a radial portion that extends over the end turns (i.e., the copper conductors that form the lead connectors all remain radially within the inner boundaries of the end turns 34). As a result, the end turns 34 are positioned radially outside of the bus bar assembly 40, and each lead 36 from the winding 30 abuts a directly opposite lead connector 42 from the bus bar 40. This allows the leads 36 to be quickly and easily connected to the lead connectors 42 by welding, soldering, or other connection methods. With all of the leads 36 connected to all of the lead connectors, the phase terminals 46 provide a connection for each phase of the windings 30 to other components associated with the electric machine 10 (e.g., an inverter, rectifier, or any of various other components).

The foregoing detailed description of one or more embodiments of the interior bus bar for an electric machine has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

Various embodiments are presented in the drawings and in the accompanying description. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

What is claimed is:

1. An electric machine comprising:
   a stator assembly including a core with windings positioned on the core, the windings including in-slot portions, end turns, and leads, the in-slot portions positioned in slots of the core, the end turns of the windings extending from the in-slot portions at opposite ends of the core, and the leads of the windings extending from the in-slot portions at one of the ends of the core with the leads extending outward from the end turns, the leads of the windings including a first plurality of leads associated with conductors in an inner layer of the slots and a second plurality of leads associated with conductors in an outer layer of the slots; and
   a bus bar assembly positioned radially inward from the end turns and including a plurality of lead connectors, each of the plurality of lead connectors connected to one of the first plurality of leads or one of the second plurality of leads.

2. The electric machine of claim 1 wherein the inner layer of the slots is an innermost layer and the outer layer of the slots is an outermost layer.

3. The electric machine of claim 1 further comprising a bus encasement including an arc portion, each of the plurality of lead connectors extending axially from the arc portion.

4. The electric machine of claim 3 wherein the end turns define radial inner boundaries and of the end turns, and wherein the arc portion of the bus encasement is disposed radially within the inner boundaries of the end turns.

5. The electric machine of claim 4 wherein the end turns define axial outer boundaries of the end turns at least part of the arc portion is disposed axially within the axial outer boundaries of the end turns.

6. The electric machine of claim 5 wherein the arc portion of the bus encasement defines an axial thickness of the bus encasement between two opposing faces, wherein at least 40% of the axial thickness of the bus encasement is disposed within the axial outer boundaries of the end turns.

7. The electric machine of claim 5 wherein the arc portion of the bus encasement defines an axial thickness of the bus encasement between two opposing faces, wherein at least 80% of the axial thickness of the bus encasement is disposed within the axial outer boundaries of the end turns.

8. The electric machine of claim 4 wherein none of the plurality of lead connectors extend to a position that is radially beyond the radial inner boundaries of the end turns.

9. The electric machine of claim 3, the bus bar further including a plurality of phase terminals extending axially from the arc portion, wherein the core has a substantially circular cross-sectional shape, wherein the arc portion has a substantially circular cross-sectional shape that is concentric with the core, wherein the arc portion includes an outer circumferential sidewall, and wherein each of the plurality of lead connectors extend axially from the arc portion at the outer circumferential sidewall.

10. The electric machine of claim 1 wherein the first plurality of leads of the windings extend in an axial direction past the end turns and directly out of the inner layers of the slots, and wherein the second plurality of leads include a radial portion that extends over the end turns.

11. The electric machine of claim 1 wherein each of the first and second plurality of leads of the windings includes an axial portion that abuts and is parallel to one of the plurality of connectors.

12. The electric machine of claim 1 wherein the windings are three phase windings, wherein the leads include eight leads associated with a first phase, eight leads associated with a second phase, and eight leads associated with a third phase.

13. The electric machine of claim 1 wherein the plurality of lead connectors are arranged in a circumferential row on a bus encasement of the bus assembly.

14. An electric machine comprising:
    a core with windings positioned on the core, the windings including in-slot portions, end turns, and leads, the in-slot portions positioned in slots of the core, the end turns extending from the in-slot portions at ends of the core, and the leads extending from the in-slot portions and axially past the end turns; and
    a bus bar assembly positioned radially inward from the end turns, the bus bar assembly including an arc portion positioned axially within the end turns, the arc portion including a plurality of lead connectors.

15. The electric machine of claim 14 wherein the arc portion is provided by an encasement comprised of an electrically insulating material.

16. The electric machine of claim 15, the arc portion further comprising a plurality of axial phase terminals, wherein the plurality of lead connectors are axial lead connectors.

17. The electric machine of claim 16 wherein the axial lead connectors and the axial phase terminals extend axially from a face of the encasement.

18. The electric machine of claim 16 wherein the arc portion includes bus bars connecting the axial phase terminals to the axial lead connectors.

19. The electric machine of claim 14 wherein the core includes a substantially circular cross-sectional shape and the arc portion is concentric with the cross-sectional shape of the core.

20. The bus bar assembly of claim 14 wherein each of the leads includes an axial portion that abuts one of the lead connectors.

* * * * *